UNITED STATES PATENT OFFICE.

PATRICK S. DEVLAN, OF NEW YORK, N. Y.

IMPROVEMENT IN THE PROCESSES OF TREATING SPONGE FOR UPHOLSTERING PURPOSES.

Specification forming part of Letters Patent No. 153,707, dated August 4, 1874; application filed April 28, 1874.

*To all whom it may concern:*

Be it known that I, PATRICK S. DEVLAN, of New York city, in the county of New York and State of New York, have invented certain new and useful Improvements in Preparing Sponge for Upholstering Purposes, of which the following is a specification:

My invention relates to a new and improved process of cleaning, bleaching, and preparing sponge for upholstering and other similar purposes; and it consists in first reducing the sponge to fragments of suitable size, by means of machinery, which at the same time separates from it all calcareous and other foreign matter, and then treating it with a hot solution of chloride of lime in water, which will separate the natural mucilage which it contains and deodorize it at the same time. After this the sponge is subjected to the action of a hot alkaline solution for the purpose of bleaching it, after which it is pressed between rollers and thoroughly washed in water to remove all traces of alkali. It is then passed through a strong solution of borax in water, or through a saponaceous compound composed of glycerine and paraffine, wax, or other fatty material combined with sufficient alkali to saponify it. The sponge, after being thus treated, is again passed between rollers to remove any superfluous quantities of the last-mentioned compound.

In carrying my invention into effect, I first reduce the sponge to small pieces or fragments, by means of any suitable cutting or disintegrating apparatus, which will separate most of the calcareous or earthy impurities during the operation. I then subject the sponge to the action of a saturated solution of chloride of lime, which removes the mucilage and bleaches the sponge. I then remove it and pass it through rollers to remove the superfluous solution of chloride of lime, and thoroughly wash it in water to remove remaining traces of said solution, and then subject it to the action of a strong solution of caustic alkali for the space of about one minute. I prefer caustic soda for this purpose, although caustic potash will answer equally as well, but is more expensive. This solution bleaches the sponge, and, after removing it, I again pass the sponge between rollers, and wash, as before, in water, to remove all traces of the alkaline bath. I then subject the sponge to the action of a saponaceous compound, consisting of borax, ten pounds dissolved in twenty gallons of water, and combined with twenty pounds of glycerine, or any waxy or fatty substance, such as paraffine, wax, stearine, &c., dissolved in oil, and combined with sufficient alkali, such as soda, &c., to saponify the mass. I prefer castor-oil as the solvent for the waxy or fatty materials, although other similar oils may be used for the purpose.

After the sponge has been thoroughly saturated with this last-mentioned compound I remove it, and press out all the superfluous compound by passing the sponge between pressing-rollers, after which it will be found perfectly cleaned, bleached, and deodorized, and thoroughly elastic, being admirably adapted for the purposes set forth.

I am aware that sponge has been cut into small pieces or fragments, and the mucilage and calcareous substances removed, and the sponge bleached by the action of chemical agents, and afterward prepared for use by treating it with a compound of borax, water, and glycerine, to render it elastic, and this I do not claim, as my invention consists in treating the purified and bleached sponge, treated as above, with a saponaceous compound, as hereinbefore stated, for the purpose of rendering it further elastic and fit for use.

What I claim, therefore, is—

The process of treating sponge after removing impurities and bleaching the same, as hereinbefore described, by subjecting it to the action of a saponaceous compound consisting of borax, water, and glycerine combined with wax, paraffine, stearine, or fatty material dissolved in oil and combined with sufficient alkali to saponify the mass, substantially as and for the purposes described.

In testimony that I claim the foregoing I have hereunto set my hand this 22d day of April, A. D. 1874.

PATRICK S. DEVLAN.

Witnesses:
TIM. J. KEANE,
A. J. DE LACY.